US006842821B2

(12) United States Patent
Nystuen

(10) Patent No.: US 6,842,821 B2
(45) Date of Patent: Jan. 11, 2005

(54) DDR SDRAM MEMORY CONTROLLER WITH MULTIPLE DEPENDENCY REQUEST ARCHITECTURE AND INTELLIGENT REQUESTOR INTERFACE

(75) Inventor: John Nystuen, Burnsville, MN (US)

(73) Assignee: LSI Logic Corporation, Milpitas, CA (US)

( * ) Notice: Subject to any disclaimer, the term of this patent is extended or adjusted under 35 U.S.C. 154(b) by 240 days.

(21) Appl. No.: 10/307,666

(22) Filed: Dec. 2, 2002

(65) Prior Publication Data

US 2004/0107324 A1 Jun. 3, 2004

(51) Int. Cl.[7] .............................................. G06F 12/00
(52) U.S. Cl. ........................ 711/105; 711/156; 711/158
(58) Field of Search ................................ 711/105, 156, 711/158

(56) References Cited

U.S. PATENT DOCUMENTS

2002/0194444 A1 * 12/2002 Goodrich et al. ........... 711/167

* cited by examiner

Primary Examiner—Jack Lane
(74) Attorney, Agent, or Firm—Fitch, Even, Tabin & Flannery

(57) ABSTRACT

A controller for a double data rate synchronous dynamic random access memory (SDRAM) includes an address storage block comprising an address storage register for each of a plurality of priority levels for receiving a memory address of a request from an incoming command queue for each of a plurality of priority levels and a priority logic block coupled to the address storage block wherein the priority logic block comprises a first priority register for storing a register number field for each of the plurality of priority levels, a second priority register for storing a request valid field for each of the plurality of priority levels, and a third priority register for storing a state machine address field for each of the plurality of priority levels.

19 Claims, 12 Drawing Sheets

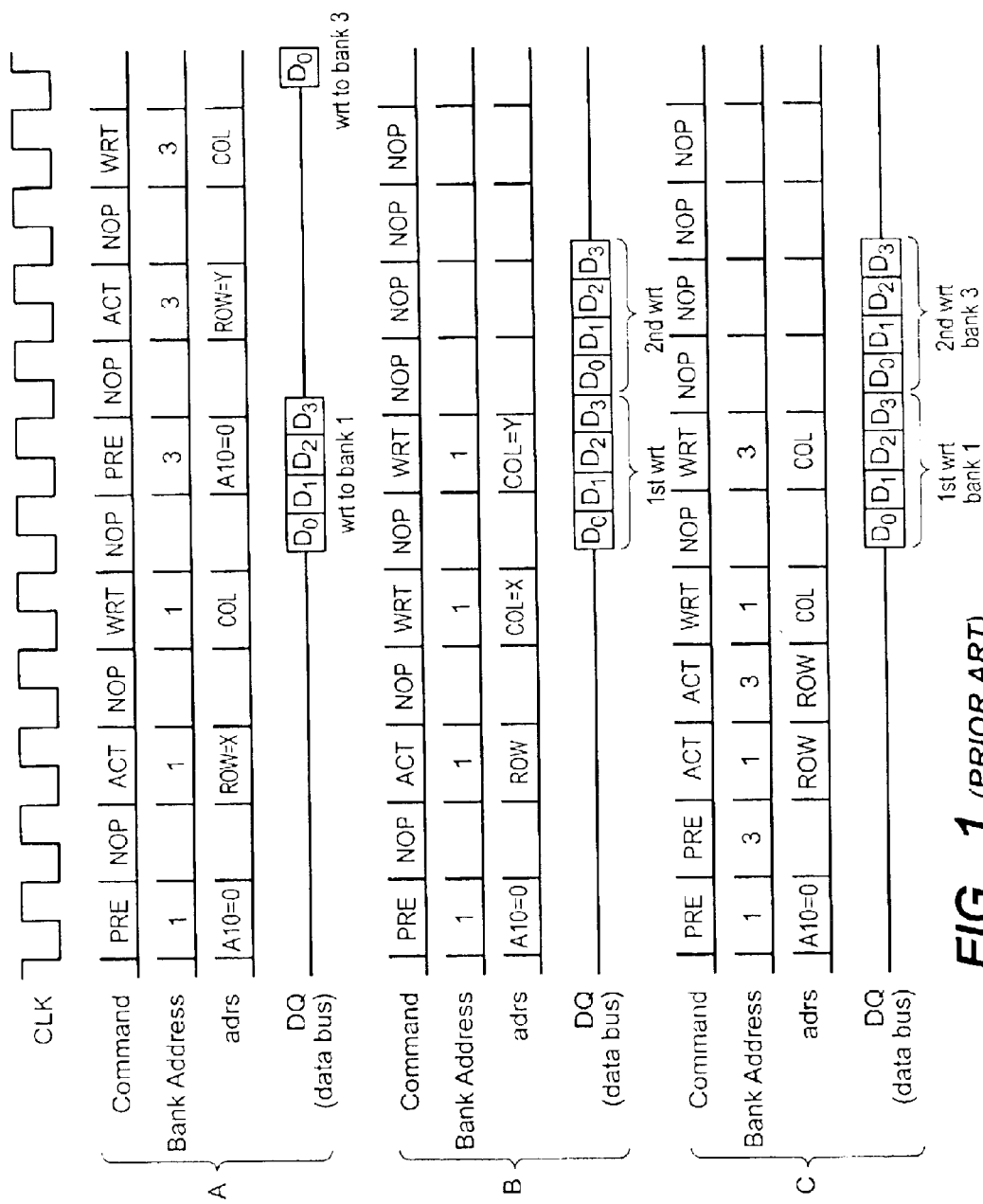
FIG._1 (PRIOR ART)

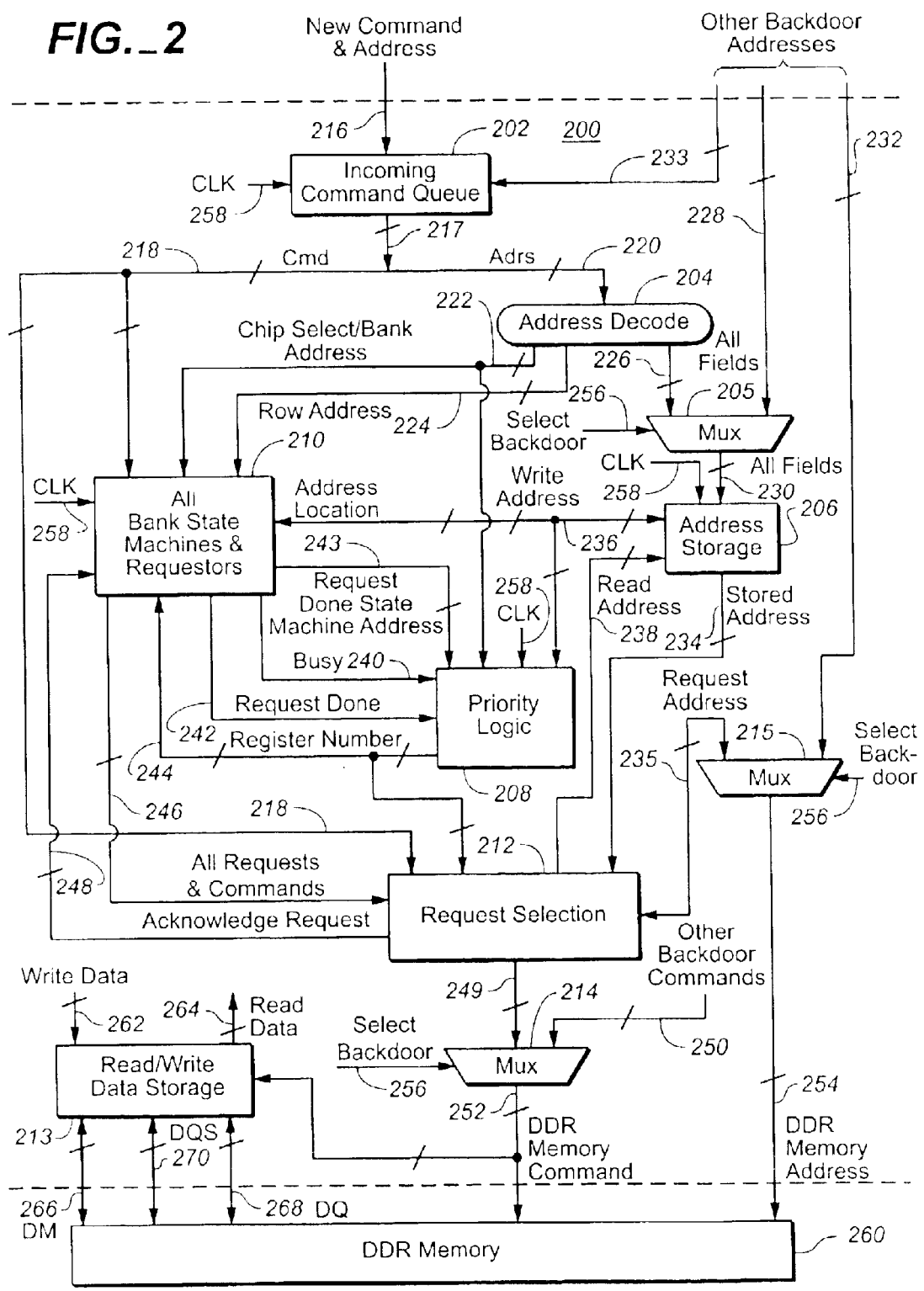
FIG._2

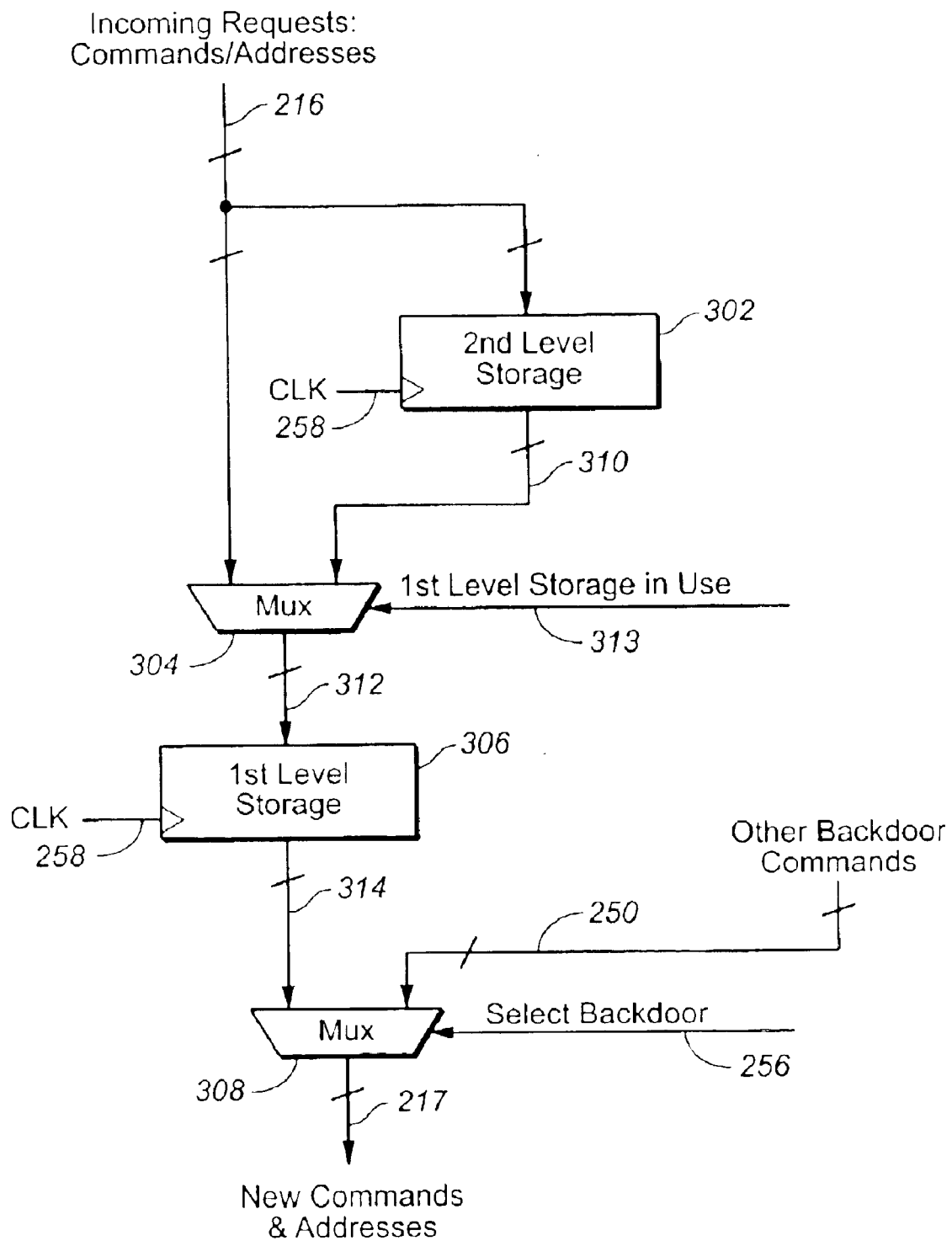
FIG._3

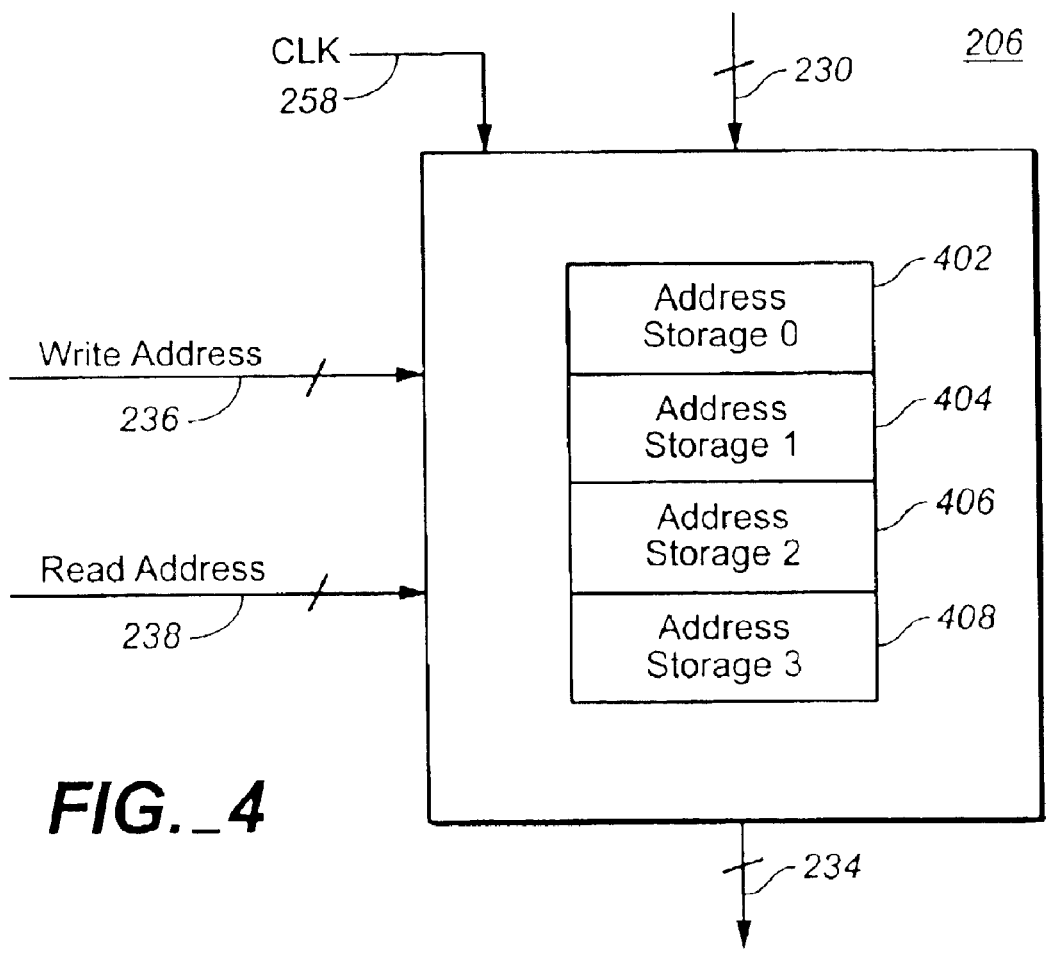
FIG._4
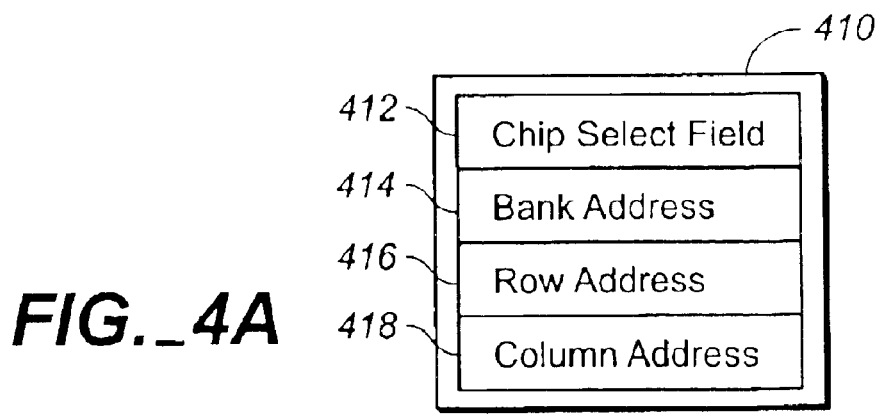
FIG._4A

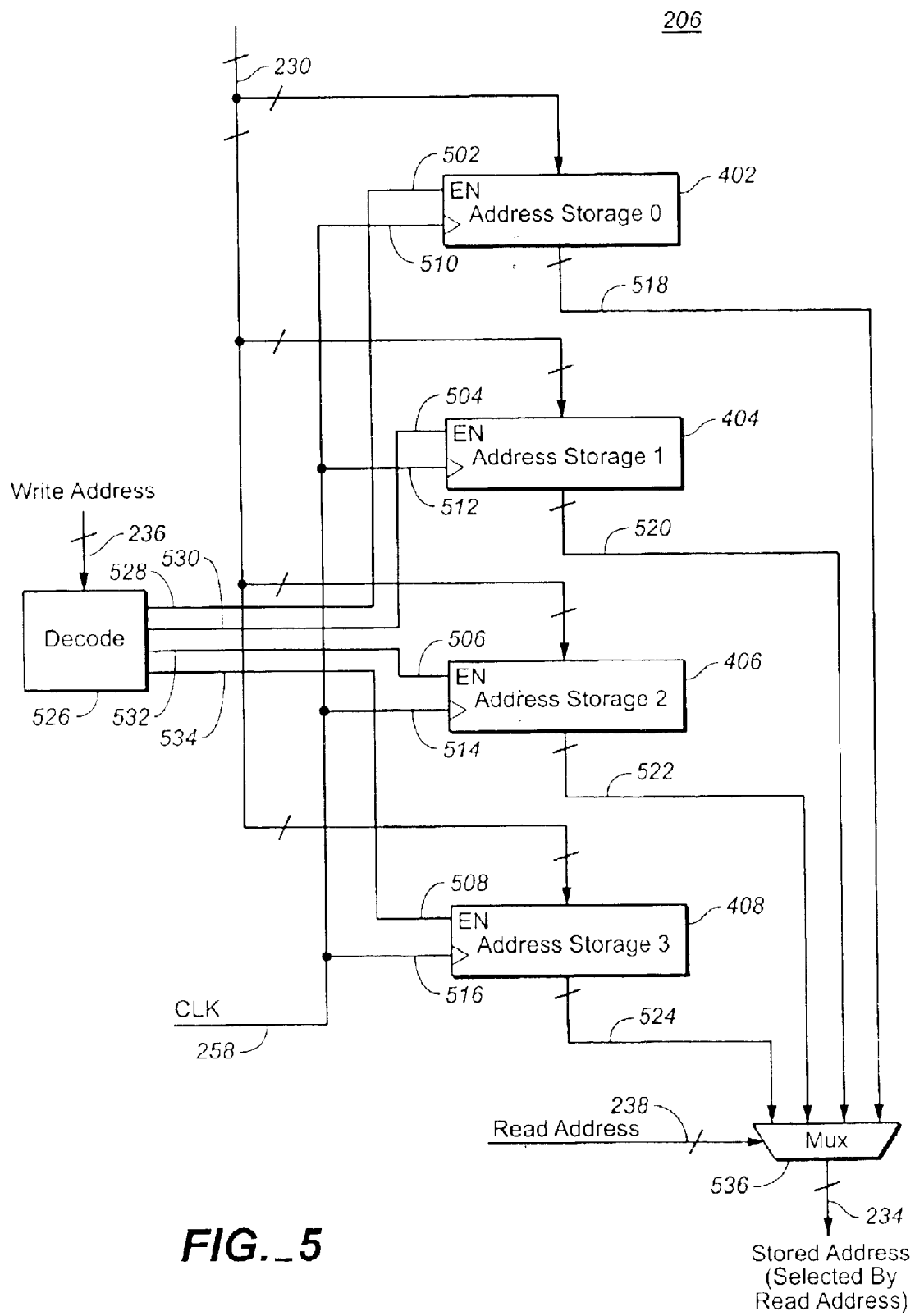
FIG._5

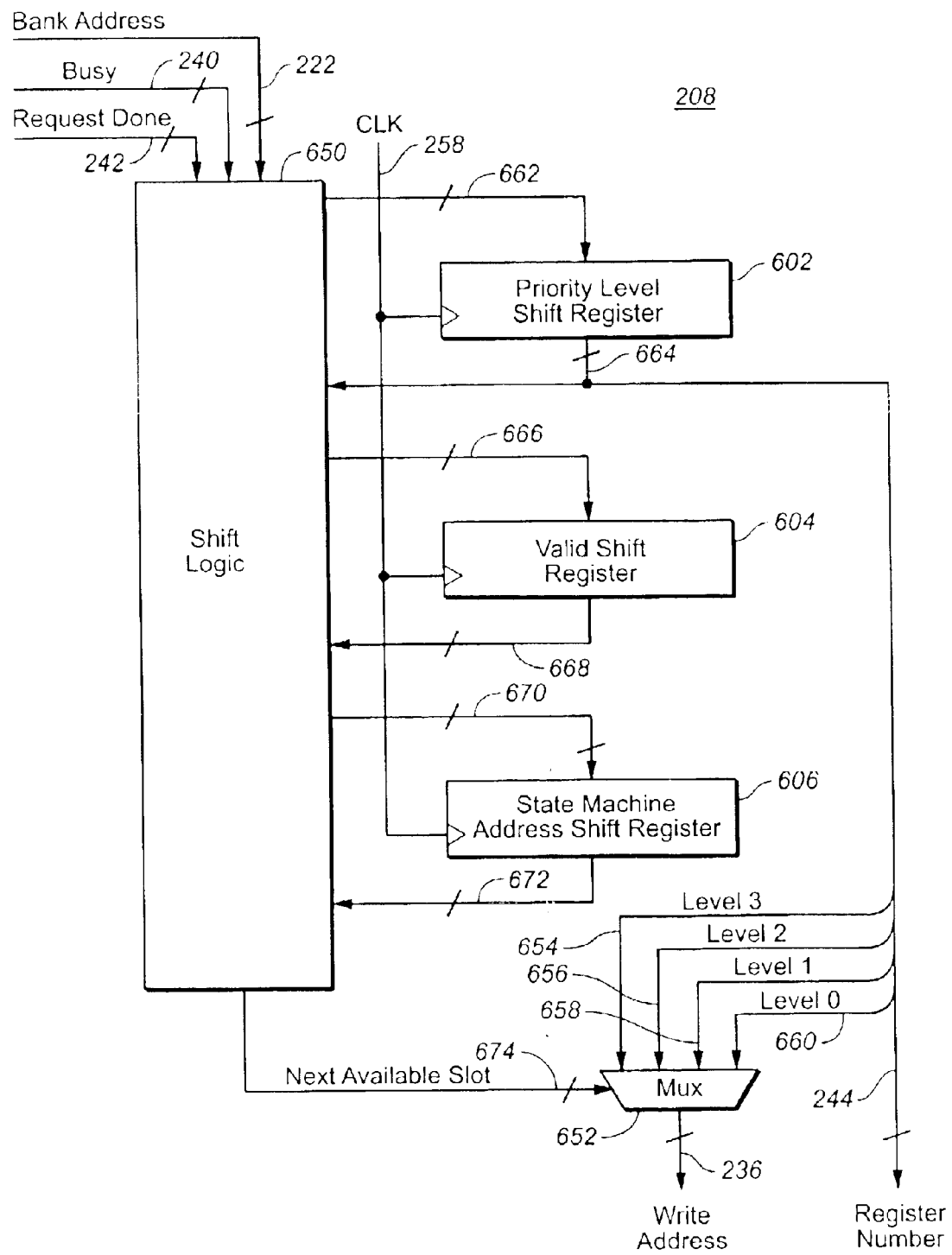
FIG._6A

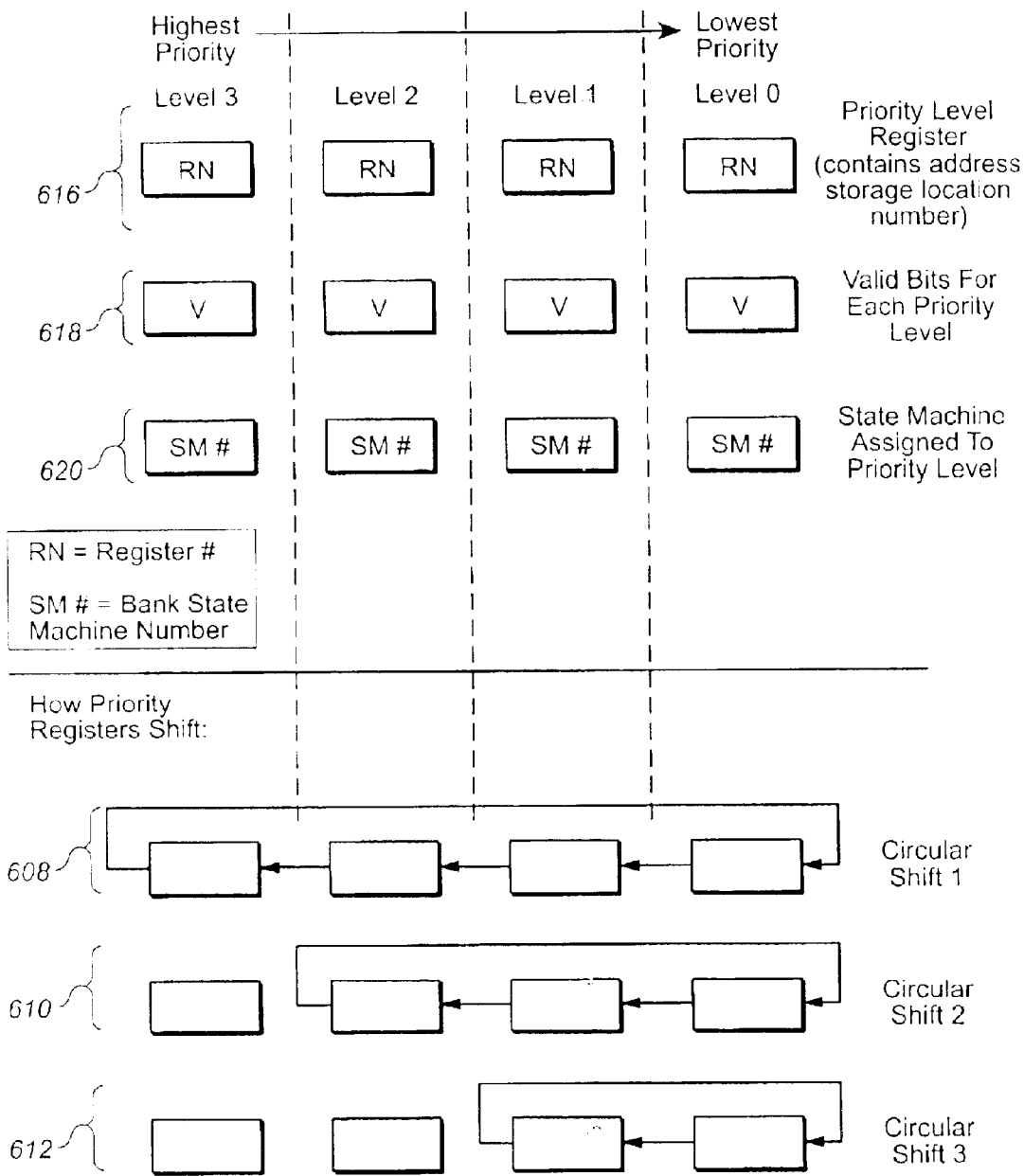
FIG._6B

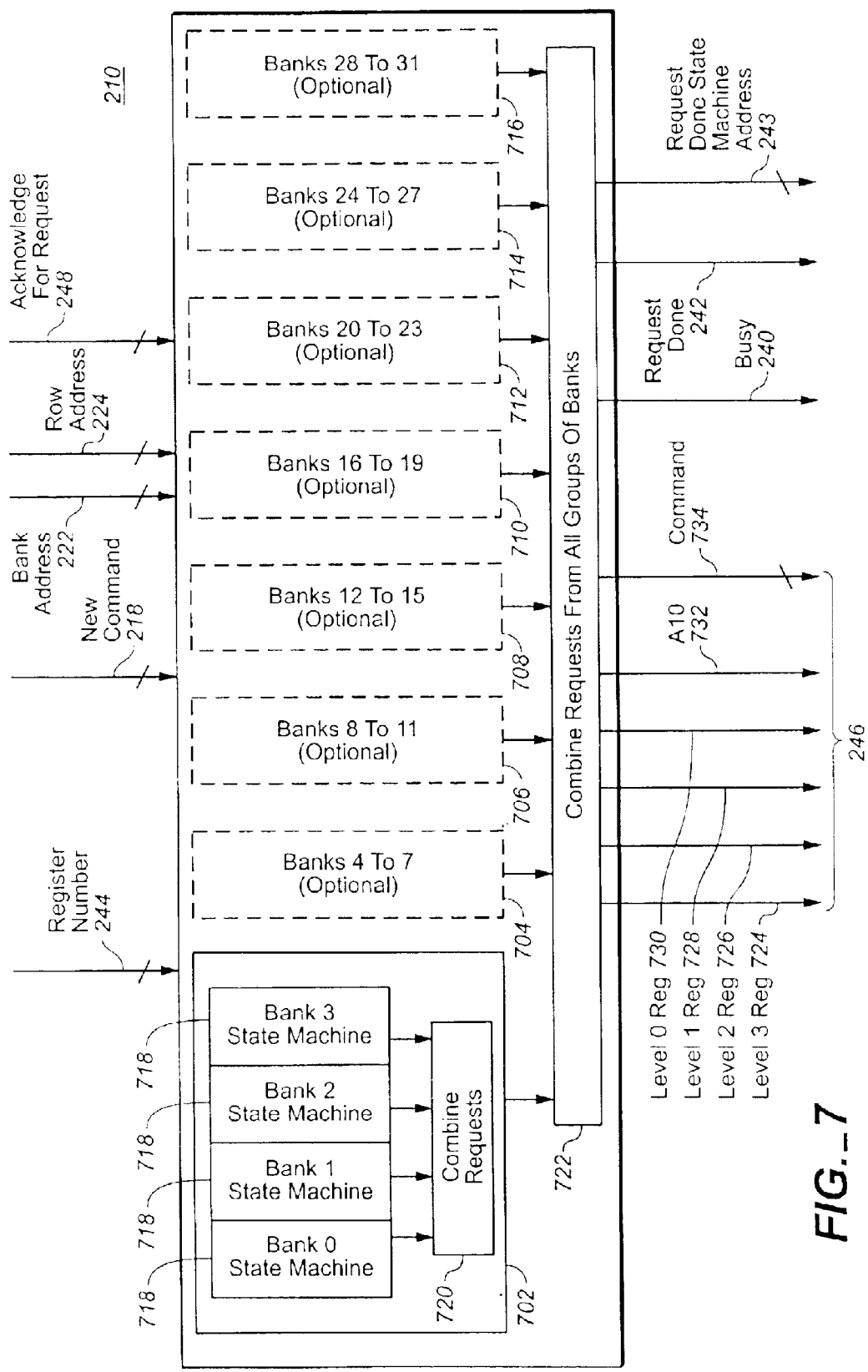
FIG._7

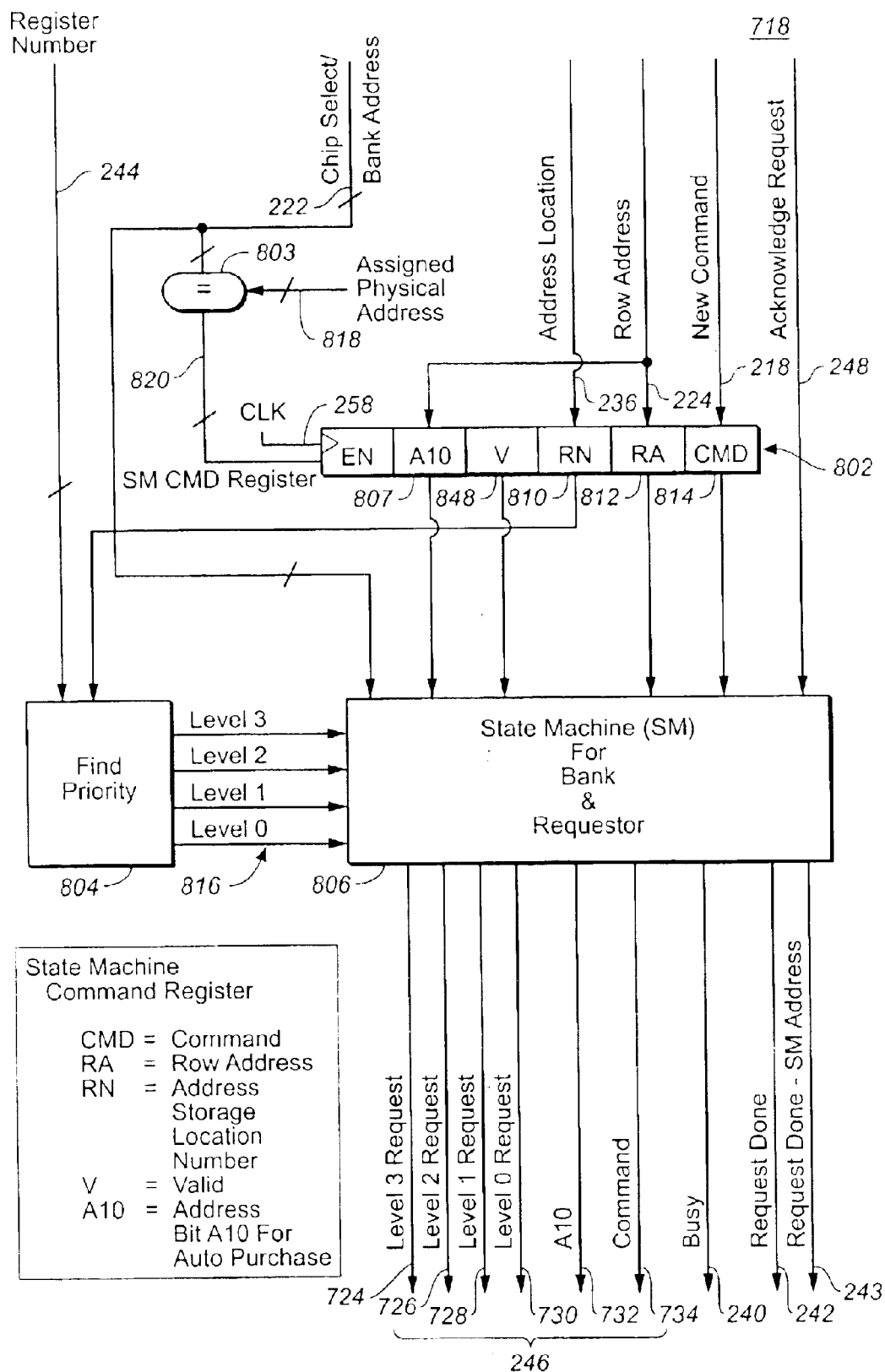
FIG._8

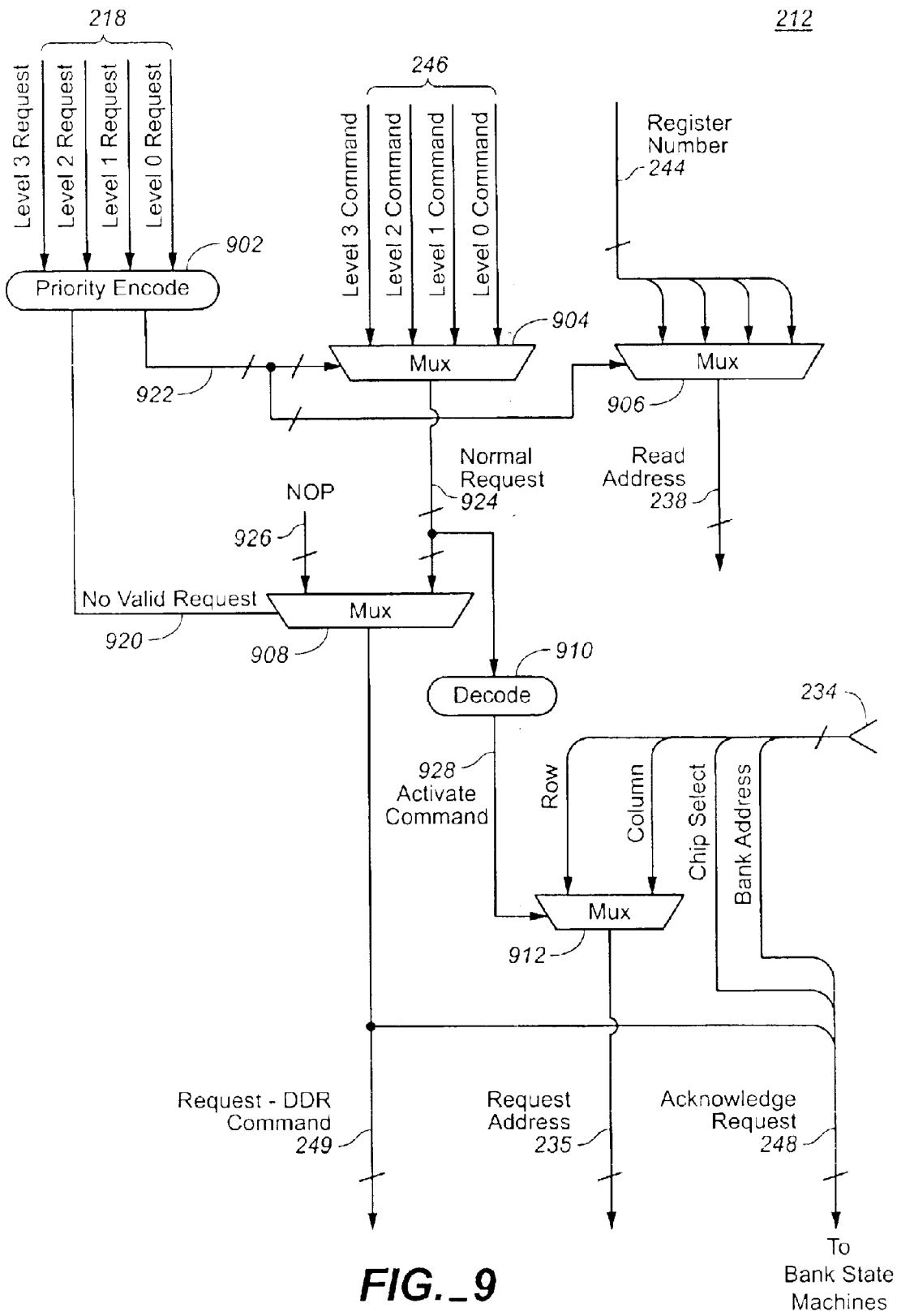
FIG._9

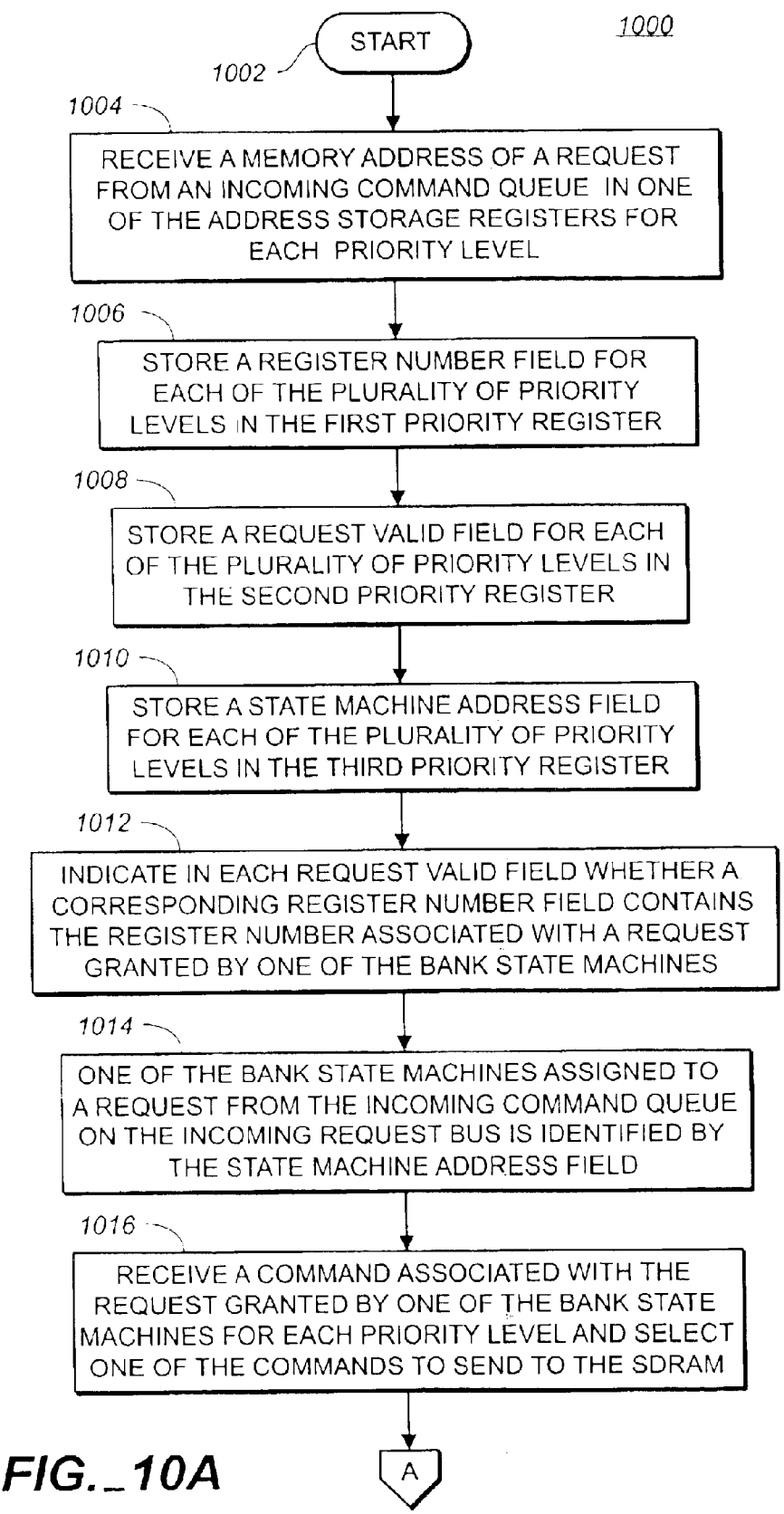

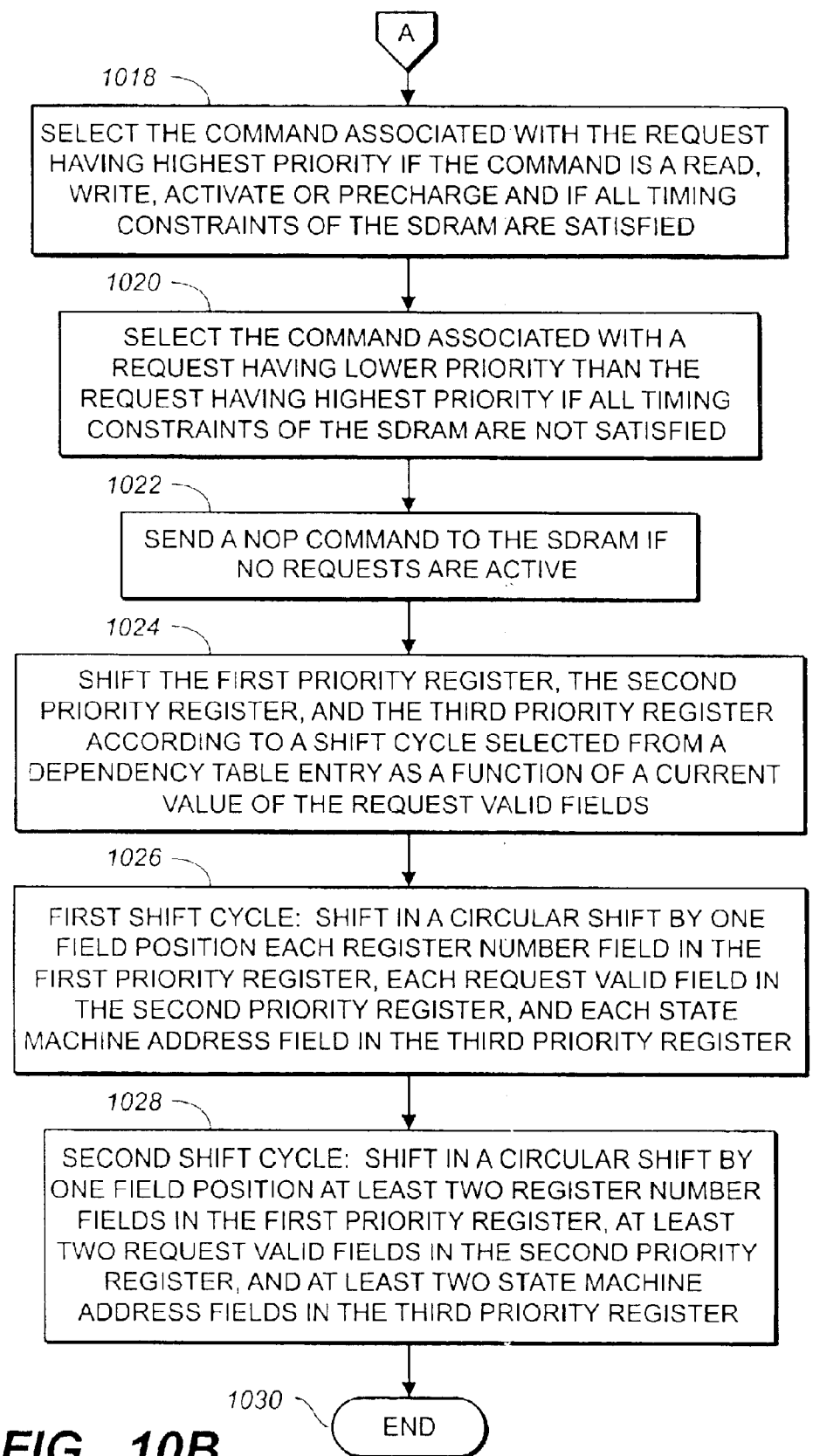
FIG._10B

US 6,842,821 B2

DDR SDRAM MEMORY CONTROLLER WITH MULTIPLE DEPENDENCY REQUEST ARCHITECTURE AND INTELLIGENT REQUESTOR INTERFACE

BACKGROUND OF THE INVENTION

1. Field of the Invention

The present invention is directed to methods and devices for controlling double data rate (DDR) synchronous dynamic random access memories (SDRAM). More specifically, but without limitation thereto, the present invention is directed to a controller for DDR SDRAM that provides an optional interface to intelligent requestors.

2. Description of the Prior Art

DDR SDRAM offers a straightforward and low cost approach to doubling the bandwidth of memory compared to the single data rate SDRAM currently in widespread use. The term "double data rate" means that the peak data rate is twice the rate at which commands may be clocked into the device. Specifically, commands are received as input on the positive edges of the memory clock, while the data is read or written on both the positive and negative edges of the memory clock. By doubling the transfer rate on the data bus while leaving unchanged the transfer rate of the more heavily loaded command and address bus, the far more costly alternative of doubling the memory bandwidth may be avoided.

SUMMARY OF THE INVENTION

In one aspect of the present invention, a controller for a double data rate synchronous dynamic random access memory (SDRAM) includes an address storage block comprising an address storage register for each of a plurality of priority levels for receiving a memory address of a request from an incoming command queue for each of a plurality of priority levels and a priority logic block coupled to the address storage block wherein the priority logic block comprises a first priority register for storing a register number field for each of the plurality of priority levels, a second priority register for storing a request valid field for each of the plurality of priority levels, and a third priority register for storing a state machine address field for each of the plurality of priority levels.

In another aspect of the present invention, a method of controlling a double data rate synchronous dynamic random access memory (SDRAM) includes receiving a memory address of a request from an incoming command queue in an address storage register for each of a plurality of priority levels, storing a register number field for each of the plurality of priority levels in a first priority register, storing a request valid field for each of the plurality of priority levels in a second priority register, and storing a state machine address field for each of the plurality of priority levels in a third priority register.

DESCRIPTION OF THE DRAWINGS

The present invention is illustrated by way of example and not limitation in the accompanying figures, in which like references indicate similar elements throughout the several views of the drawings, and in which:

FIG. 1 illustrates a timing diagram of memory command sequences of the prior art for three scenarios;

FIG. 2 illustrates a DDR SDRAM controller according to an embodiment of the present invention;

FIG. 3 illustrates an incoming command queue for the DDR SDRAM controller of FIG. 2;

FIG. 4 illustrates an address storage block for the DDR SDRAM controller of FIG. 2;

FIG. 4A illustrates an expanded view of an address storage register in the address storage block of FIG. 4;

FIG. 5 illustrates a detailed diagram of the address storage block shown in FIG. 4;

FIG. 6A illustrates a priority logic block for the DDR SDRAM controller of FIG. 2;

FIG. 6B illustrates the three shift cycles of the priority registers in the priority logic block of FIG. 6A;

FIG. 7 illustrates a bank state machines and internal requestors block for the DDR SDRAM controller of FIG. 2;

FIG. 8 illustrates an example of a bank state machine for the bank state machines and internal requestors block of FIG. 7;

FIG. 9 illustrates a request selection block for the DDR SDRAM controller of FIG. 2; and FIG. 10 illustrates a flow chart for a method of controlling a double data rate synchronous dynamic random access memory (SDRAM) according to an embodiment of the present invention.

Elements in the figures are illustrated for simplicity and clarity and have not necessarily been drawn to scale. For example, the dimensions of some of the elements in the figures may be exaggerated relative to other elements to help to improve understanding of the following description of the illustrated embodiments.

To simplify referencing in the description of the illustrated embodiments of the present invention, indicia in the figures may be used interchangeably to identify both the signals that are communicated between the elements and the connections that carry the signals. For example, an address communicated on an address bus may be referenced by the same number used to identify the address bus.

DESCRIPTION OF THE ILLUSTRATED EMBODIMENTS

Double data rate (DDR) synchronous dynamic random access memory (SDRAM) is accessed according to a set of rules and timing constraints. DDR SDRAM controllers are designed to interface central processor units (CPUs) with the SDRAM and to ensure compliance with the rules and timing constraints. The DDR SDRAM interface requires a differential clock, a clock enable, a command bus, a bank address bus, an address bus, a bidirectional data bus, a data mask bus, and a bidirectional data strobe bus.

The command bus and the address bus operate at the single clock rate on the rising clock edge, while the data bus operates at twice the single clock rate on both the rising and the falling clock edges. A memory command is formed by encoding four signal lines: chip select (Csn), row address (RASn), column address (CASn), and write enable (WEn), where n indicates an active low signal. The memory commands are encoded by driving the four signal lines of the command bus as illustrated in Table 1 below:

TABLE 1

DDR SDRAM commands

| FUNCTION | CSn | RASn | CASn | WEn | ADDRESS BUS |
|---|---|---|---|---|---|
| Deselect (NOP) | H | X | X | X | X |
| No Operation (NOP) | L | H | H | H | X |
| Active | L | L | H | H | Bank/Row |
| Read | L | H | L | H | Bank/Col; A10 = H, autoprecharge |
| Write | L | H | L | L | Bank/Col; A10 = H, autoprecharge |
| Burst Terminate | L | H | H | L | X |
| Precharge | L | L | H | L | A10 = L, Bank; A10 = H, all banks |
| Auto or Self Refresh | L | L | L | H | X |
| Load Mode Register | L | L | L | L | Op Code |

In Table 1, L indicates a low signal, H indicates a high signal, and X indicates an ignored signal.

The memory array within a DDR SDRAM chip is divided into four banks. A column address and a row address is required to access a specific memory location within each bank. The DDR SDRAM address bus is multiplexed as shown in Table 1. The row address is output on the address bus during an Activate command, and the column address is output on the address bus during a Read or Write command.

An Activate command activates a bank so that all column addresses within the specified row address may be accessed by a Read or Write Command.

A Read command initiates a read burst that begins by placing the column address on the address bus. A read burst may be performed with or without autoprecharge. With autoprecharge, a Precharge command is performed automatically by the DDR SDRAM after the Read burst. Without autoprecharge, the bank is left open for future Read or Write commands.

A Write command initiates a write burst that begins by placing the column address on the address bus. Write bursts may also be performed with or without autoprecharge in the same manner as described above for a read burst.

A Precharge command prepares the bank specified by the bank address bits if address bit A10 is low to receive a new Activate command for a different row address. If address bit A10 is high, then all banks are prepared to receive a new Activate command.

An Auto Refresh command periodically refreshes the DDR SDRAM to retain the data. The Auto Refresh command must be preceded by a Precharge command to all banks.

A sequence or subset of the following command sequence is required for each access of a memory location: Precharge, Activate and Read/Write.

FIG. 1 illustrates a timing diagram of memory commands of the prior art for three scenarios. In scenario A, the first memory command is a Precharge, assuming that the selected bank "1" must be placed in a precharged state for a subsequent Read or Write memory command. To satisfy timing constraints that prevent sending memory commands in consecutive clock cycles to the same bank, NOP commands are inserted after each command. The Activate command is sent accompanied by the row address after the required time delay following the Precharge command. After the required time delay following the Activate command, a Read or Write command may be sent accompanied by the column address.

If the next memory command for the same bank is a Read or Write command and the row address is the same as that of the first Read or Write command, then an additional Read or Write command may be performed after the first Read or Write command as shown in scenario B. Otherwise, another Precharge, Activate and Read/Write sequence must be performed as shown in scenario A. To satisfy the timing constraints, several NOP commands are interspersed among the successive sequences of Precharge, Activate and Read/Write commands. The number of NOP commands may advantageously be minimized so that multiple requests may be performed concurrently.

In scenario C, a sequence of two Write commands for two different banks "1" and "3" is shown. In this example, some of the NOP commands in the first write request for bank "1" are replaced by Precharge and Activate commands for the second write request for bank "3". The Precharge and Activate commands for the second write request are "hidden" in the first write request and are therefore called "hidden requests". Reducing the required number of memory clock cycles in scenario A by using hidden requests as shown in scenario C significantly improves the throughput of the DDR SDRAM.

A DDR SDRAM controller architecture generally includes the following functions:

(a) each DDR SDRAM request is directed to the proper bank state machine;

(b) multiple requests may be granted concurrently so that more than one bank state machine may have an active request;

(c) read and write requests are performed in the order received;

(d) requests that are not read and write requests may be initiated out of order as hidden requests;

(e) a request acknowledge is directed specifically to the requestor for which a request granted for any number of requestors that may have concurrently active requests; and (f) the number of concurrently active requests must be limited to the capacity of the DDR SDRAM controller.

In one aspect of the present invention, a controller for a double data rate synchronous dynamic random access memory (SDRAM) includes an address storage block comprising an address storage register for each of a plurality of priority levels for receiving a memory address of a request from an incoming command queue for each of a plurality of priority levels and a priority logic block coupled to the address storage block wherein the priority logic block comprises a first priority register for storing a register number field for each of the plurality of priority levels, a second priority register for storing a request valid field for each of the plurality of priority levels, and a third priority register for storing a state machine address field for each of the plurality of priority levels.

FIG. 2 illustrates a DDR SDRAM controller 200 according to an embodiment of the present invention. Shown in FIG. 2 are an incoming command queue block 202, an address decoder 204, an address decoder mux 205, an address storage block 206, a priority logic block 208, a bank state machines and internal requestors block 210, a request selection block 212, a read/write data storage block 213, a DDR command mux 214, a DDR address mux 215, an incoming request bus 216, an incoming command queue output 217, a request command bus 218, a request address bus 220, a chip select/bank address bus 222, a row address bus 224, a decoded address bus 226, a first auxiliary address bus 228, an address decoder mux output 230, a second auxiliary address bus 232, a third auxiliary address bus 233, a stored address bus 234, a request address bus 235, a write address bus 236, a read address bus 238, a busy signal 240, a request done signal 242, a request done state machine address bus 243, a register number bus 244, a bank state machine request and command bus 246, an acknowledge request bus 248, a request DDR command bus 249, an auxiliary command bus 250, a DDR memory command bus 252, a DDR memory address bus 254, an auxiliary select signal 256, a clock signal 258, a DDR SDRAM 260, a command write data bus 262, a command read data bus 264, a data mask (DM) bus 266, a data (DQ) bus 268, and a data strobe (DQS) bus 270.

The DDR SDRAM controller 200 analyzes memory requests and determines the proper sequence of DDR SDRAM commands, decodes the memory address accompanying the memory request, directs the memory request to the appropriate internal requestor, stores the decoded address in a convenient format for the DDR SDRAM, assigns a priority to the memory request so that concurrent memory requests by the internal requestors may be resolved, maintains the read and write requests in the order received, and allows hidden memory requests to be performed without creating a conflict with the request having the highest priority.

Direct access to the controller 200 is provided by the auxiliary or "backdoor" address buses 228, 232 and 233 and the auxiliary command bus 250. The auxiliary buses are selected by driving the auxiliary select signal 256 at the control inputs of the address decoder mux 205, the DDR command mux 214 and the DDR address mux 215 according to well known techniques. The clock signal 258 is also generated according to well known techniques.

FIG. 3 illustrates an incoming command queue block 202 for the DDR SDRAM controller 200 of FIG. 2. Shown in FIG. 3 are the incoming request bus 216, the incoming command queue output 217, the third auxiliary address bus 233, the auxiliary command select signal 256, the clock signal 258, a second level storage register 302, a storage register mux 304, a first level storage register 306, an incoming command queue output mux 308, a second level register output 310, a second level mux output 312, a second level mux select 313, and a first level register output 314.

The incoming requests 216 from outside the DDR SDRAM controller 200 for the DDR memory 260 are stored in an incoming command queue in at least one of the first level storage register 306 and the second level storage register 302. The first level storage register 306 stores the incoming request 216 and the second level mux select 313 switches the second level mux output 312 to the incoming request bus 216 if no other requests are pending in the incoming command queue. If a new incoming request 216 arrives while the first level storage register 306 is being used, the new incoming request 216 is stored in the second level storage register 308, and the second level mux select 313 switches the second level mux output 312 to the second level register output of the second level storage register 308. On the next clock 258, the incoming request 216 stored in the first level storage register 306 is replaced by the new incoming request 216 stored in the second level storage register 302, and another new incoming request 216 may be stored in the second level storage register 302.

The second level storage register 302 and the first level storage register 306 provide buffering for performing hidden requests and also serve as holding registers for decoding the memory address so that the request may be directed to the appropriate bank state machine. The second level storage register 302 and the first level storage register 306 also limit the rate of the incoming requests to the frequency of the clock signal 258 to maintain the allowable number of concurrently active requests within the capacity of the controller. The maximum number of concurrently active requests may be programmed from two to six according to well known techniques.

The incoming command queue output mux 308 provides an auxiliary input for the third auxiliary address 233 to allow direct access to the controller 200 when the auxiliary select signal 256 is active.

Referring now to FIG. 2, the address decoder 204 partitions the decoded request address on the address bus 220 into four fields: a chip select, a bank address, a row address, and a column address. The chip select and bank addresses are also output on the chip select/bank address bus 222, and the row address is output on the row address bus 224. The bit widths of the row address 224 and the chip select/bank address 222 are specific to the size and configuration of the DDR SDRAM used with the controller 200. The chip select and bank address fields are used to direct the request command bus 218 to one of 32 possible bank state machines in the bank state machines and internal requestors block 210. The row address 224 is stored by the selected bank machine in the bank state machines and internal requestors block 210. The chip select, the bank address, the row address, and the column address fields are also communicated to the address storage block 206 on the decoded address bus 226.

FIG. 4 illustrates an address storage block 206 for the DDR SDRAM controller 200 of FIG. 2. Shown in FIG. 4 are the address decoder mux output 230, the write address 236, the read address 238, the stored address bus 234, the clock signal 258, and address storage registers 402, 404, 406 and 408.

The address storage block 206 provides a centralized address storage facility for the DDR SDRAM controller 200. The centralized storage facility avoids the necessity of storing all the address fields in each bank state machine, which would require the unnecessary addition of many extra gates. Also, the performance of the DDR SDRAM controller 200 is enhanced by facilitating access to the memory address once a request from a bank state machine is granted.

FIG. 4A illustrates an expanded view 410 of an address storage register in the address storage block of FIG. 4. Shown in FIG. 4A are a storage register format 410, a chip select field 412, a bank address field 414, a row address field 416, and a column address field 418.

FIG. 5 illustrates a detailed diagram of the address storage block 206 shown in FIG. 4. Shown in FIG. 5 are the address decoder mux output 230, the write address bus 236, the read address bus 238, the stored address bus 234, the clock signal 258, the address storage registers 402, 404, 406 and 408, address storage register enable inputs 502, 504, 506 and 508, address storage register clock inputs 510, 512, 514 and 516, address storage register outputs 518, 520, 522 and 524, a write address decoder 526, write address decoder outputs 528, 530, 532 and 534, and a stored address mux 536.

Each of the address storage registers 402, 404, 406 and 408 receives the four address fields of a memory address shown in the storage location format 410 of FIG. 4 from the address decoder mux output 230.

The write address 236 is received from the priority logic block 208 in FIG. 2 to indicate which of the address storage registers 402, 404, 406, and 408 is available for the next incoming request. The write address decoder 526 decodes the write address 236 onto the write address decoder outputs 528, 530, 532 and 534. The write address decoder outputs 528, 530, 532 and 534 are received by the address storage register enable inputs 502, 504, 506 and 508 respectively so that the address decoder mux output 230 is stored in the enabled address storage register 402, 404, 406 or 408 when the clock 258 is received at the address storage register clock inputs 510, 512, 514 and 516.

The request selection block 212 matches the request being granted with the address decoder mux output 230 and outputs the read address 238 to the stored address mux 536. The stored address mux 536 selects one of the address storage register outputs 518, 520, 522 and 524 that corresponds to the read address 238 and outputs the selected one of the address storage register outputs 518, 520, 522 and 524 on the stored address bus 234.

FIG. 6A illustrates a priority logic block 208 for the DDR SDRAM controller 200 of FIG. 2. Shown in FIG. 6A are the chip select/bank address 222, the write address bus 236, the busy signal 240, the request done signal 242, the clock signal 258, priority registers 602, 604 and 606, a shift logic block 650, a priority mux 652, a priority level "3" output 654, a priority level "2" output 656, a priority level "1" output 658, a priority level "0" output 660, a priority input bus 662, a priority output bus 664, a valid input bus 666, a valid output bus 668, a state machine address input bus 670, a state machine address output bus 672, and the next available slot bus 674.

The priority logic block 208 provides the heart of the multiple dependency architecture. All the dependencies are managed by the three priority registers 602, 604 and 606. Each of the priority registers 602, 604 and 606 is a shift register that contains four fields. Each field corresponds to one of the four priority levels "3", "2", "1" and "0" that are assigned to requests in the order the requests are received. In other embodiments, more or fewer priority levels may be used to practice the invention in specific applications. The four fields of the priority register 602 contain the register number of the address storage register in the address storage block 206 that corresponds to the decoded address for each of the four priority levels. The priority register 604 contains a request valid field for each of the four priority levels. The request valid field indicates whether a request is active at each of the four corresponding priority levels. The priority register 606 contains the state machine address assigned to each of the four priority levels. Each of the priority registers 602, 604 and 606 shifts by one field position for each clock signal 258 according to one of three shift cycles shown in FIG. 6B.

FIG. 6B illustrates the three shift cycles of the priority registers 602, 604 and 606 in the priority logic block 208 of FIG. 6A. Shown in FIG. 6B are the register number fields 616 of the priority register 602 for each of the four priority levels, the four request valid fields 618 of the priority register 604, the four state machine address fields 620 of the priority register 606, and circular shift types 608, 610 and 612.

The three priority registers 602, 604 and 606 all shift together by one field position according to one of the three circular shift types 608 (type 1), 610 (type 2) and 612 (type 3).

Each of the four register number fields 616 contains a register number of one of the address storage registers 402, 404, 406 and 408 in the address storage block 206 in FIG. 5. For example, the register number field 616 for the priority level "3" may contain a "2" to indicate that the highest priority request has its associated address stored in the storage register 406.

Each of the four request valid fields 618 indicates whether the address stored in the corresponding storage register of the address storage block 206 is associated with an active request granted by one of the bank state machines in the bank state machines and internal requestors block 210 of FIG. 2.

Each of the four state machine address fields 620 identifies which of the bank state machines in the bank state machines and internal requestors block 210 is assigned to a valid request from the incoming command queue for each corresponding priority level.

Each of the three priority registers 602, 604 and 606 is shifted or rotated by one register field by the clock signal 258 each time a request is completed. In this example, the highest priority is level "3". The next highest priority is level "2", the next highest priority is level "1", and the lowest priority is level "0".

When a new request is received by the DDR SDRAM controller 200 of FIG. 2, the request is assigned a position, or slot, in each of the priority registers 602, 604 and 606 at the highest available priority for which the corresponding request valid field 618 in the priority register 604 indicates there is no currently active request.

A bank state machine in the bank state machines and internal requestors block 210 may only make a request for a DDR read or write burst at the highest priority level. In this example, the highest level priority is a level "3" priority. This constraint ensures that read and write requests are always performed in the order received.

Requests for Precharge and Active commands may be made by a bank state machine at any priority level, that is, requests for Precharge and Active commands are not blocking and may be performed in any order. The highest priority request will be granted, however, if the DDR timing constraints delay part of a request from a high priority requester, one of the lower priority requests may be performed instead of a NOP command ahead of a higher priority request as illustrated in scenario C of FIG. 1.

When a bank state machine in the bank state machines and internal requestors block 210 completes a request, a request done 242 that includes the bank state machine number is sent from the bank state machine to the priority logic block 208. The priority logic block 208 then clears the request valid field 618 in the priority register 604 for the priority level that corresponds to the bank state machine number. The priority registers 602, 604 and 606 are then shifted by one field position so that all valid requests are shifted to a higher priority level. As explained above, an incoming request for a read or write may involve sending three commands to a DDR SDRAM: Precharge, Active and Read/Write. Each of these commands must be requested separately, therefore the request done 242 would not be sent until after the read or write burst request is performed.

An important feature of the DDR SDRAM controller 200 of the present invention is that the request architecture is adaptable to the sophistication of the requestor. If the requestor is a simple requestor, that is, a requestor that sends only read and write requests, then only a type 1 circular shift 608 is required, because Read and Write requests may only be performed by state machines having the highest level priority. In this example, level "3" requests may be shifted into priority level register 608 from a lower priority level only within priority shift register 602.

If the requestor is a sophisticated requestor, Precharge and Active requests may be sent in addition to the Read and Write requests. Precharge and Active requests may be completed by a state machine assigned to a lower priority than the highest level requestor by a type 2 circular shift 610. For example, priority levels "3", "1" and "0" may each contain a Write request, while priority level "2" may contain a Precharge request. In this example, the Precharge request completes at priority level "2" before the other requests that are waiting to reach priority level "3". The priority registers 602, 604 and 606 are then shifted to the next higher priority level by a type 2 circular shift 610 to ensure that a new Read or Write request is not assigned a higher priority than the other active requests.

A type 3 circular shift 612 would involve performing a Precharge or Active request at a level "1" priority ahead of the Read or Write request at a level "0" priority.

The shift logic block 650 implements the priority dependencies of the request valid fields 618, the request done signal 242, the next available slot 674, and whether the shift cycle is a type 1, a type 2 or a type 3 circular shift by matching the previous request valid fields 618 of the priority register 604 with the table entries shown in the priority dependency Table 2 below.

In addition to shifting the priority registers 602, 604 and 606 to the next higher priority level after each request is performed, the request valid field 618 corresponding to a completed request may need to be cleared as well as shifted. In addition, the next available slot at the highest possible priority must be determined. Table 2 indicates how the value of the request done 242, the next available slot 674, and whether a new request will set the corresponding valid field 618 in the priority register 604 after the next clock cycle according to the current state of the valid fields 618.

In Table 2, N indicates that if a new request is pending, the valid field 618 will be set on the next clock cycle, otherwise the valid field 618 will be cleared. M indicates that the current value of the valid field 618 is maintained, and S indicates that the new value of the valid field 618 is shifted in from the next lower priority valid field 618 in the priority register 604.

TABLE 2

| PREVIOUS REQUEST VALID | REQUEST DONE | NEXT HIGHEST AVAILABLE SLOT | NEXT REQUEST VALID VALUE | PRIORITY SHIFT REGISTER TYPE |
|---|---|---|---|---|
| 3210 | 3210 | 3210 | 3210 | |
| 0000 | 0000 | 1000 | N000 | NONE |
| 1000 | 0000 | 0100 | MN00 | NONE |
| 1000 | 1000 | 1000 | N000 | NONE |
| 1100 | 0000 | 0010 | MMN0 | NONE |
| 1100 | 1000 | 0010 | SN00 | 1 |
| 1100 | 0100 | 0100 | MN00 | NONE |
| 1110 | 0000 | 0001 | MMMN | NONE |
| 1110 | 1000 | 0001 | SSN0 | 1 |
| 1110 | 0100 | 0001 | MSN0 | 2 |
| 1110 | 0010 | 0010 | MMN0 | NONE |
| 1111 | 0000 | 0000 | MMMM | NONE (FULL) |
| 1111 | 1000 | 1000 | SSSN | 1 |
| 1111 | 0100 | 0100 | MSSN | 2 |
| 1111 | 0010 | 0010 | MMSN | 3 |
| 1111 | 0001 | 0001 | MMMN | NONE |

FIG. 7 illustrates a bank state machines and internal requestors block 210 for the DDR SDRAM controller 200 of FIG. 2. Shown in FIG. 7 are the request command bus 218, the chip select/bank address bus 222, the row address 224, the busy signal 240, the request done signal 242, the request done state machine address bus 243, the register number bus 244, the bank state machine request and command bus 246, the acknowledge request bus 248, bank state machine groups 702, 704, 706, 708, 710, 712, 714 and 716, bank state machines 718, a bank request combiner 720, and a bank group request combiner 722. The bank state machine request and command bus 246 includes a level "3" request 724, a level "2" request 726, a level "1" request 728, a level "0" request 730, an address bit bus A10 732, and a priority command bus 734.

The bank state machines and internal requestors block 210 contains at least one bank state machine group 702 that includes four of the bank state machines 718. In the example of FIG. 7, a total of up to 32 bank state machines 718 may be accommodated in groups of four in each of the bank state machine groups 702, 704, 706, 708, 710, 712, 714 and 716. Each of the bank state machines 718 is mapped to a corresponding memory bank in the DDR SDRAM 260 in FIG. 2. The bank state machine group 702 thus maps to banks 0 through 3 for chip select 0. The chip select and bank address are concatenated to form a physical address with the top three bits representing the chip selects and the remaining two bits representing the bank address. The bank state machine group 704 is assigned to the chip select/bank address 4 through 7, the bank state machine group 706 is assigned to the chip select/bank address 8 through 11, and so on through the other bank state machine groups through the bank state machine group 716 assigned to the chip select/ bank address 28 through 31.

The bank request combiner 720 and the bank group request combiner 722 logically "OR" the bank state machine request and commands 246 from each of the bank state machines 718 to generate the busy signal 240, the request done signal 242, the request done state machine address 243, the level "3" request 724, the level "2" request 726, the level "1" request 728, the level "0" request 730. The address bits A10 for each of the four priority levels are output on the address bit bus A10 732. The commands for each of the four priority levels are output on the priority command bus 734.

FIG. 8 illustrates a bank state machine 718 for the bank state machines and internal requestors block 210 of FIG. 7. Shown in FIG. 8 are the request command bus 218, the chip select/bank address 222, the row address 224, the write address bus 236, the register number bus 244, the acknowledge request bus 248, the clock signal 258, the level "3" request 724, the level "2" request 726, the level "1" request 728, the level "0" request 730, the address bit A10 732, the priority command 734, a state machine command register 802, an address comparator 803, a priority finder block 804, a state machine 806, an A10 field 807, a valid field 808, a register number field 810, a row address field 812, a command field 814, find priority block outputs 816, a physical address 818, and an address comparator output 820.

Each state machine 806 manages four SDRAM memory banks to access a memory location and to transmit Precharge, Activate and Read/Write commands to each memory bank according to the timing constraints of the specific SDRAM being used. The state machine 806 may be, for example, the standard state machine provided by the JEDEC standard JESD79, Double Data Rate (DDR) SDRAM Specifications. Other state machines may also be used to practice the present invention according to techniques well known in the art.

The design of FIG. 8 allows each bank state machine 718 to be an internal requester of the DDR SDRAM. The distributed internal requester structure allows each of the bank state machines 718 to operate independently and facilitates the addition or subtraction of bank state machines 718 to suit specific applications. Further, as the number of signals required to interface among the bank state machines increases, the request logic for a centralized architecture becomes unwieldy, limiting the maximum rate at which requests may be performed by the DDR SDRAM controller. The distributed internal requestor structure avoids the increased complexity of a centralized architecture, thereby maintaining the maximum performance rate as the total number of bank state machines 718 is increased.

Each bank state machine 718 is assigned its own physical address 818 that ranges from 0 to 31 for the 32 possible state machines. The address comparator 803 compares the physical address 818 with the chip select/bank address 222 and enables the state machine command register 802 if the comparison matches. When the next clock signal 258 is received by the bank state machine 718, the new request command 218, the write address 236, and the row address 224 are loaded into corresponding fields in the state machine command register 802.

The state machine command register 802 includes the A10 field 807, the valid field 808, the register number field 810, the row address field 812, and the command field 814. The A10 field 807 is bit 10 of the column address and is used with Read and Write commands to determine whether the request requires that the burst command be performed with autoprecharge. The valid field 808 is set to indicate that a new command has been loaded into the command register and has not yet been completed. The register number field 810 indicates the address storage location where the memory address associated with the request is stored and determines the priority level of the request. The row address field 812 received from the address decoder 204 is stored as the current row address by the state machine 806 with each Activate command. The state machine 806 compares the row address field 812 with the current row address for each request for a read or write burst for which the memory bank in the DDR SDRAM 260 assigned to the state machine 806 is active. The command field 814 contains the memory command to be performed.

When the state machine 806 receives the memory command from the state machine command register 802, the busy signal 240 is set if the state machine 806 currently has a valid request. The busy signal 240 from each state machine 806 is OR'ed together by the request combiner 720 in FIG. 7. The use of OR logic to combine the busy signal 240 from each state machine 806 provides faster performance than inserting muxes. If the state machine 806 is busy, then the memory command must wait.

In this example, the maximum number of bank state machines 718 that can have valid requests is four, because the address storage block 206 has only four address storage registers 402, 404, 406 and 408. This limitation minimizes logic while providing efficient use of the memory bandwidth and minimum latency for incoming commands. The incoming command queue 202 holds two requests, so that the total number of active requests including the four in the bank state machines 718 is six. The total number of requests that may be active in a specific application is the number of requests that may be queued in the incoming command queue 202 plus the number of address storage registers in the address storage block 206.

The register number 244 is received by the find priority block 804. The register number 244 contains the four register number fields 616 from the priority register 602 in FIG. 6B. Each of the four register number fields 616 corresponds to the address storage location assigned to each priority level. The find priority block 804 determines the priority level for the state machine 806 by comparing the register number field 810 in the state command register 802 with each of the four register number fields 616 and driving one of the priority block outputs 816 that matches the priority level of the register number field 810.

The state machine 806 determines whether a request may be sent to the request selection block 212 from the state machine command register 802 and the priority level of the request. Read and Write commands can only be requested if the state machine 806 has the highest priority, and a request may also be delayed by other constraints. When a request is ready, the state machine 806 drives the priority request 818 corresponding to the priority level indicated by the find priority block outputs 816. The A10 field 806 and the command field 814 are also generated as output on the address bit A10 732 and the priority command 734. The level "3" request 724, the level "2" request 726, the level "1" request 728, and the level "0" request 730 are also logically OR'ed together from all the bank state machines 718 in the same way as the busy signal 240 so that only the selected state machine 806 having the proper priority can drive the bank state machine requests and commands bus 246 in FIG. 2.

When the state machine 806 completes executing the request, the valid field 808 in the state machine command register 802 is cleared, and the request done signal 242 and the request done state machine address 243 are sent to the priority logic block 208. The priority logic block 208 then releases the corresponding address location to accept a new request and shifts the priority registers 602, 604 and 606 to move pending requests to the next higher priority level.

FIG. 9 illustrates a request selection block 212 for the DDR SDRAM controller 200 of FIG. 2. Shown in FIG. 9 are the request command bus 218, the stored address bus 234, the request address bus 235, the read address bus 238, the register number bus 244, the bank state machine requests and commands bus 246, the acknowledge request bus 248, the request DDR command bus 249, a priority encoder 902, a priority command mux 904, a priority register mux 906, a DDR command mux 908, a request decoder 910, a request address mux 912, a valid request signal 920, a priority encoder output 922, a DDR command mux output 924, a NOP command 926, and a request decoder output 928.

The request selection block 212 generates the acknowledge request 248 to the bank state machines and internal requestors block 210 so that the bank state machine driving the bank state machine requests and commands bus 246 can determine whether its request was granted.

The request selection block 212 receives the four priority level commands on the request command bus 218, any combination of which (or none) may be active. The priority encoder 902 encodes the request command bus 218, and the encoded value is used to select the highest priority request from the priority command mux 904 if the request is a Read, Write, Activate or Precharge and if all timing constraints of the SDRAM are satisfied. The selected read address associated with the request command is output on the request address bus 235. If a bank state machine is prevented from making the highest priority request due to a timing constraint of the SDRAM, then the command associated with the request having a lower priority than the request having highest priority is selected. If no requests are active, the valid request signal 920 switches the DDR command mux 908 to output the NOP command 926 on the request DDR command bus 249. The request decoder 910 decodes the DDR command mux output 924 to determine whether the requested command is an Activate command. The request decoder output 928 switches the address mux 912 to select either the row or the column address from the stored address bus 234 to be output on the request address bus 235.

The acknowledge request 248 consists of the chip select, the bank address, and the command that was performed. The acknowledge request 248 is sent to all the bank state machines 718. Each of the bank state machines 718 compares its address with the bank address in the acknowledge request 248 to determine whether its request was granted.

The multiple dependency architecture of the DDR SDRAM controller 200 ensures that Read and Write commands are performed in the order in which they are received and accepts all other commands as non-blocking, and assigns a priority to each request upon receipt of the request.

The read/write data storage block 213 buffers read data on the command read data bus 264 and write data on the command write data bus 262 between the incoming read and write commands and the data management (DM) bus 266, the data strobe (DQS) bus 270, and the data (DQ) bus 268 of the DDR SDRAM 260 according to well known techniques. The operation of the read/write data storage block 213 is controlled by the DDR memory command bus 252 from the DDR command mux 214 according to well-known techniques.

The distributed request architecture of the DDR SDRAM controller 200 resolves simultaneous requests according to priority. The centralized address storage for each request conserves logic, since only the row address is needed by each internal requestor.

The DDR SDRAM controller 200 may be used with a simple requestor such as a microprocessor bus or a FIFO that issues only Read and Write commands, in which case the DDR SDRAM controller 200 automatically inserts the Precharge, Activate, and Refresh commands as needed, or the DDR SDRAM controller 200 may be used with a sophisticated requestor that issues part or all of the DDR SDRAM command repertoire except for the burst terminate and mode register set commands.

In another aspect of the present invention, a method of controlling a double data rate synchronous dynamic random access memory (SDRAM) includes receiving a memory address of a request from an incoming command queue in an address storage register for each of a plurality of priority levels, storing a register number field for each of the plurality of priority levels in a first priority register, storing a request valid field for each of the plurality of priority levels in a second priority register, and storing a state machine address field 620 for each of the plurality of priority levels in a third priority register.

FIG. 10 illustrates a flow chart 1000 for a method of controlling a double data rate synchronous dynamic random access memory (SDRAM) according to an embodiment of the present invention.

Step 1002 is the entry point of the flow chart 1000.

In step 1004, a memory address of a request from an incoming command queue is received in one of the address storage registers 402, 404, 406 and 408 for each of a plurality of priority levels.

In step 1006, a register number field for each of the plurality of priority levels is stored in the priority register 602. Each register number field contains a register number of a corresponding address storage register.

In step 1008, a request valid field for each of the plurality of priority levels is stored in the priority register 604.

In step 1010, a state machine address field 620 for each of the plurality of priority levels is stored in the priority register 606.

In step 1012, each request valid field is set or cleared to indicate whether a corresponding register number field 616 contains the register number associated with a request granted by one of the bank state machines 718.

In step 1014, one of the bank state machines 718 assigned to a request from the incoming command queue on the incoming request bus 216 is identified by the state machine address field 620.

In step 1016, a command associated with the request granted by one of the bank state machines 718 is received for each priority level and one of the commands is selected to send to the SDRAM.

In step 1018, the command associated with the request having highest priority is selected if the command is a Read, Write, Activate or Precharge and if all timing constraints of the SDRAM are satisfied.

In step 1020, if a bank state machine is prevented from making the highest priority request due to a a timing constraint of the SDRAM, then the command associated with the request having a lower priority than the request having highest priority is selected.

In step 1022, if no requests are active, a NOP command is sent to the SDRAM.

In step 1024, the first priority register, the second priority register, and the third priority register are shifted according to a shift cycle selected from a dependency table entry in Table 2 above as a function of a current value of the request valid fields 848.

In step 1026, a first shift cycle includes shifting in a circular shift by one field position each register number field 616 in the first priority register 602, each request valid field 618 in the second priority register 604, and each state machine address field 620 in the third priority register 606.

In step 1028, a second shift cycle includes shifting in a circular shift by one field position at least two register number fields 616 in the first priority register 602, at least two request valid fields 618 in the second priority register 604, and at least two state machine address fields 620 in the third priority register 620.

Step 1030 is the exit point of the flow chart 1000.

Although the method of the present invention illustrated by the flowchart description above is described and shown with reference to specific steps performed in a specific order, these steps may be combined, sub-divided, or reordered without departing from the scope of the claims. Unless specifically indicated herein, the order and grouping of steps is not a limitation of the present invention.

While the invention herein disclosed has been described by means of specific embodiments and applications thereof, numerous modifications and variations may be made thereto by those skilled in the art without departing from the scope of the invention set forth in the following claims.

What is claimed is:

1. A controller for a double data rate synchronous dynamic random access memory (SDRAM) comprising:
    an address storage block comprising an address storage register for each of a plurality of priority levels for receiving a memory address of a request from an incoming command queue for each of a plurality of priority levels; and
    a priority logic block coupled to the address storage block wherein the priority logic block comprises a first priority register for storing a register number field for each of the plurality of priority levels, a second priority register for storing a request valid field for each of the plurality of priority levels, and a third priority register for storing a state machine address field for each of the plurality of priority levels.

2. The controller of claim 1 wherein each register number field contains a register number of a corresponding address storage register.

3. The controller of claim 2 wherein each request valid field indicates whether a corresponding register number field contains the register number associated with a request granted by one of a plurality of bank state machines.

4. The controller of claim 3 wherein each state machine address field identifies one of the plurality of bank state machines to which a request from the incoming command queue is assigned.

5. The controller of claim 3 further comprising a request selection block for receiving a command associated with the request granted by one of the plurality of bank state machines for each of the plurality of priority levels and for selecting which command to send to the SDRAM.

6. The controller of claim 5 wherein the request selection block selects the command associated with the request having highest priority if the command is a Read, Write, Activate or Precharge and if all timing constraints of the SDRAM are satisfied.

7. The controller of claim 6 wherein the request selection block selects the command associated with the request having lower priority than the request having highest priority if all timing constraints of the SDRAM are not satisfied.

8. The controller of claim 6 wherein the request selection block sends a NOP command to the SDRAM if no requests are active.

9. The controller of claim 1 further comprising a shift logic block for shifting the first priority register, the second priority register, and the third priority register according to one of a plurality of shift cycles selected from a dependency table entry wherein the dependency table entry is a function of a current value of each request valid field.

10. The controller of claim 9 wherein a first shift cycle of the plurality of shift cycles comprises a circular shift by one field position of each register number field in the first priority register, each request valid field in the second priority register, and each state machine address field in the third priority register.

11. The controller of claim 10 wherein a second shift cycle of the plurality of shift cycles comprises a circular shift by one field position of at least two register number fields in the first priority register, at least two request valid fields in the second priority register, and at least two state machine address fields in the third priority register.

12. A method for controlling a double data rate synchronous dynamic random access memory (SDRAM) comprising:

receiving a memory address of a request from an incoming command queue in an address storage register for each of a plurality of priority levels;

storing a register number field for each of the plurality of priority levels in a first priority register;

storing a request valid field for each of the plurality of priority levels in a second priority register; and storing a state machine address field for each of the plurality of priority levels in a third priority register.

13. The method of claim 12 wherein each register number field contains a register number of a corresponding address storage register.

14. The method of claim 13 further comprising indicating in each request valid field whether a corresponding register number field contains the register number associated with a request granted by one of a plurality of bank state machines.

15. The method of claim 14 further comprising identifying in each state machine address field one of the plurality of bank state machines to which a request from the incoming command queue is assigned.

16. The method of claim 14 further comprising receiving a command associated with the request granted by one of the plurality of bank state machines for each of the plurality of priority levels and selecting which command to send to the SDRAM.

17. The method of claim 16 further comprising selecting the command associated with the request having highest priority if the command is a Read, Write, Activate or Precharge and if all timing constraints of the SDRAM are satisfied.

18. The method of claim 17 further comprising selecting the command associated with the request having lower priority than the request having highest priority if all timing constraints of the SDRAM are not satisfied.

19. The method of claim 17 further comprising sending a NOP command to the SDRAM if no requests are active.

* * * * *